United States Patent [19]

Willice

[11] Patent Number: 4,877,011
[45] Date of Patent: Oct. 31, 1989

[54] BARBECUE PIT

[76] Inventor: George W. Willice, 7000 Hawthorne, Apt. 333, Hollywood, Calif. 90028

[21] Appl. No.: 231,200

[22] Filed: Aug. 11, 1988

[51] Int. Cl.$^4$ ............................................. A47J 37/07
[52] U.S. Cl. ..................... 126/25 R; 126/8; 126/21 A; 126/41 R; 99/345; 99/350
[58] Field of Search ............ 126/8, 25 R, 41 R, 41 A, 126/41 B, 41 C, 41 D, 41 E, 21 A; 99/339, 345, 475, 482, 450

[56] References Cited

U.S. PATENT DOCUMENTS

| | | | |
|---|---|---|---|
| 2,472,164 | 6/1949 | Mannheimer | 126/8 X |
| 3,344,737 | 10/1967 | Sanders | 126/8 X |
| 3,524,403 | 8/1970 | Treloar | 126/41 R X |
| 4,073,225 | 2/1978 | Lang-Ree | 99/345 X |
| 4,418,615 | 12/1983 | Higgins | 126/21 A X |
| 4,590,848 | 5/1986 | Willingham | 126/41 A X |
| 4,702,224 | 10/1987 | Griffith | 126/8 |

Primary Examiner—Margaret A. Focarino
Attorney, Agent, or Firm—Kajane McManus

[57] ABSTRACT

The barbecue pit comprises a shell of masonry including a bottom wall, side walls, a back wall and a partial front wall. The shell further includes two inner wall sections which divide the space within the shell into identical first, second and third compartments extending front to back within the shell. The first compartment includes a cooking chamber having a plurality of horizontal grates removably supported therein and also includes a topless heat chamber having heat source means located beneath said cooking chamber for supplying heat and smoke to the cooking chamber. The second compartment includes a sauce applying chamber having a container of sauce therein and means for applying the sauce to cooked meat placed in the chamber. The third compartment includes a sauce drying chamber including a plurality of horizontal grates removably supported therein and a plurality of ultraviolet light emitting means situated about the chamber for drying the sauce onto the meat to provide prepared meat, and also includes a prepared meat storing chamber including heat source means for maintaining the prepared meat at a predetermined temperature. An exhaust hood forms a top wall of the shell and mounts means therein for exhausting gas and smoke from within the compartments upwardly into a chimney of the hood.

15 Claims, 2 Drawing Sheets

BARBECUE PIT

BACKGROUND OF THE INVENTION

1. Field of the Invention

The invention relates to improvements in barbeque pits and more particularly to masonry barbecue pits. The masonry barbecue pit of the present invention provides multiple chambers, novel means for drying barbecue sauce onto cooked meat without drying the meat out during the process, and means for preventing the smoke and fumes from the fire box from exiting the pit when the doors to various chambers thereof are opened.

2. Description of the Prior Art

Heretofore various barbecue pit structures have been proposed. Examples of such previously proposed barbecue pit structures are disclosed in the following U.S. Patents:

| U.S. Pat. No. | Patentee |
| --- | --- |
| 3,344,737 | Sanders |
| 4,162,650 | Davis et al. |
| 4,401,018 | Berry |
| 4,418,615 | Higgins |
| 4,590,848 | Willingham |
| 4,702,224 | Griffith |

The Sanders U.S. Pat. No. 3,344,737 discloses a barbecue pit wherein grease drippings from the meat being cooked are kept from contacting the flames used in cooking the meat to eliminate a burnt like taste from the meat.

The Davis et al., U.S. Pat. No. 4,162,650 discloses an enclosed cooking apparatus for barbecuing meat wherein multiple chambers are provided and wherein a pan filled with water is used to generate steam which is utilized to entrain smoke generated during the cooking process to provide for rapid heat transfer and wherein the pan holding the water is also used to receive drippings of grease and fat from the cooking meat. The meat is predominantly supported above the pan on a plurality of upright skewers.

The Berry U.S. Pat. No. 4,401,018 discloses an insulated cooking apparatus for roasting, broiling or smoking meat or other food which provides hangers for maintaining the meat over a source of heat in such a manner that the meat is constantly moving above the source of heat. The hangers are moved by an electric motor.

The Higgins U.S. Pat. No. 4,418,615 discloses a convection barbecue pit wherein heated smoke from a fire box passes through a flue into a cooking chamber which has a discharge duct and fan in the ceiling thereof to draw the smoke entering the cooking chamber through a suction port to exhaust same. The flue may be set to exhaust smoke around the cooking chamber when the pit is in an evacuation mode.

The Willingham U.S. Pat. No. 4,590,848 discloses a cooker for cooking food such as barbecue or the like. The cooker comprises a tower having a rotating carousel therein and various means on the carousel for holding food to be cooked. A heat source is offset from beneath the cooking tower and is positioned below a warming a tower located alongside the cooking tower. Both the warming tower and the cooking tower are mounted to and supported on a wheeled carriage.

The Griffith U.S. Pat. No. 4,702,224 discloses a barbecue pit which comprises a masonry structure including a chimney portion and a fire box portion laterally adjacent to and intercommunicating with the chimney portion. The fire box portion is topped by a hood frame having an access opening therein. The side walls of the fire box form an upper horizontal ledge upon which a removable metal drip trough structure is supported, with the trough being fed by an angle drip plate having a predetermined slope so that fat dripping onto the plate is directed into the trough structure.

As will be described in greater detail hereinafter, the barbecue pit of the present invention differs from previously proposed barbecue pit structures by providing a chamber within the pit wherein sauce applied to the meat after cooking is dried onto cooked meat by ultraviolet lights so that only the sauce is dried, and not the meat and further by providing fans beneath an exhaust hood of the pit which are operated upon the opening of doors of the chambers of the pit to keep smoke and fumes from escaping through the open doors.

SUMMARY OF THE INVENTION

According to the invention there is provided a barbecue pit comprising: a shell of masonry including a bottom wall, side walls, a back wall and a partial front wall, said shell further including two inner wall sections which divide the space within the shell into identical first, second and third compartments extending front to back within the shell; the first compartment including a cooking chamber having a plurality of horizontal grates removably supported therein and a topless heat chamber including heat source means located beneath the cooking chamber for supplying heat and smoke to the cooking chamber; the second compartment including a sauce applying chamber having a container of sauce therein and means for applying the sauce to cooked meat placed in the chamber; the third compartment including a sauce drying chamber including a plurality of horizontal grates removably supported therein and a plurality of ultraviolet light emitting means situated about the chamber for drying the sauce onto the meat to provide prepared meat, and a prepared meat storing chamber including heat source means for maintaining the prepared meat at a predetermined temperature; and an exhaust hood forming a top wall of the shell and mounting means therein for exhausting gas and smoke from within the compartments upwardly into a chimney of the hood.

DESCRIPTION OF THE PREFERRED EMBODIMENT

Figure 1:
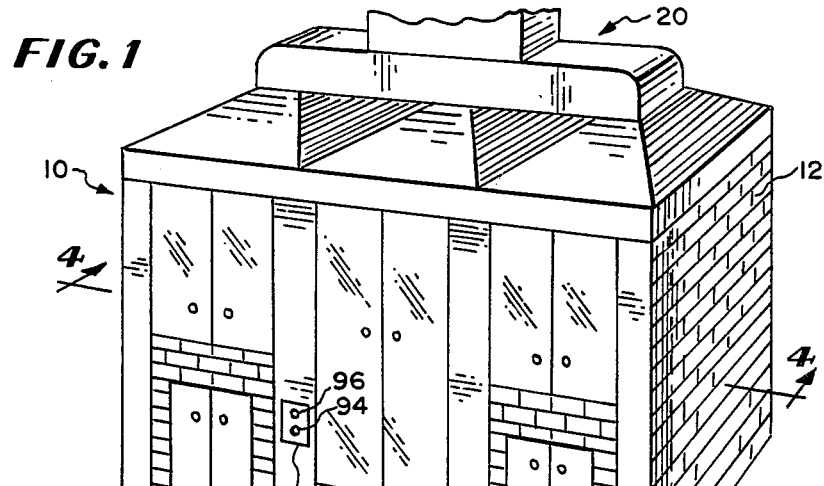
FIG. 1 is a perspective frontal view of the barbecue pit of the present invention.

Referring now to the drawings in greater detail, there is illustrated in FIG. 1 a barbecue pit 10 constructed according to the teachings of the present invention. As illustrated, the pit 10 comprises a masonry shell 12 which retains heat and is provided with three sections, a cooking section 14, a sauce applying section 16 and a sauce drying and storage section 18.

The shell 12 is topped by an exhaust hood structure 20 which acts to exhaust gases and smoke from the sections 14, 16, and 18 of the pit 10.

Figure 2:
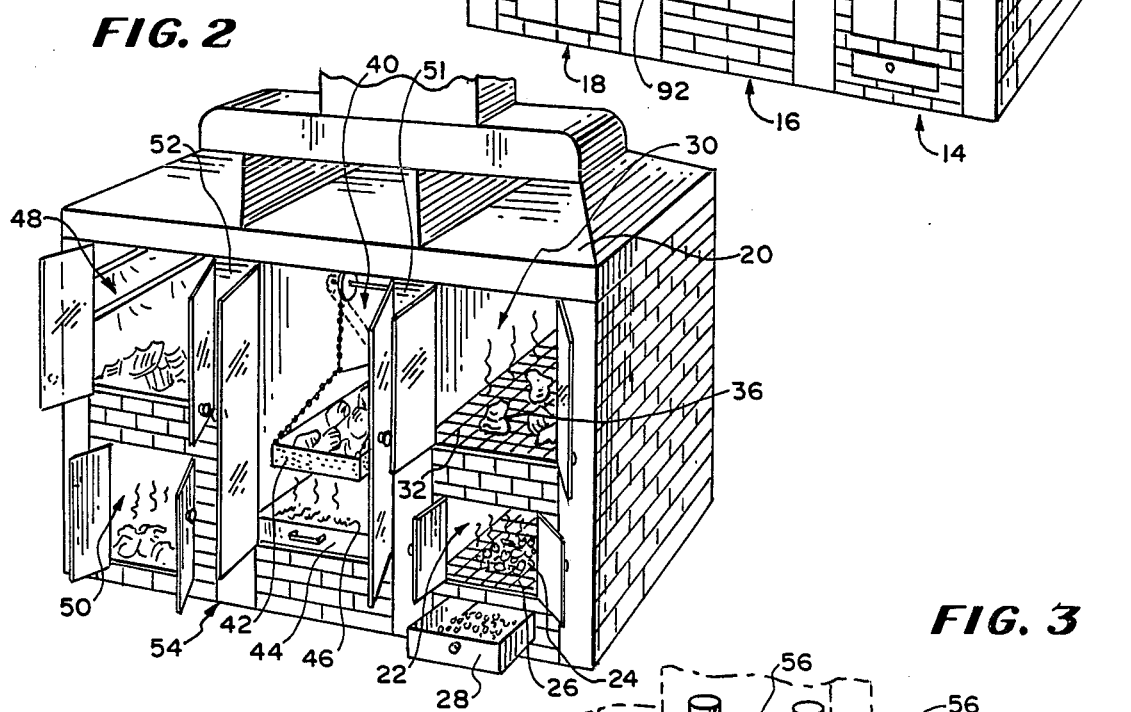
FIG. 2 is a perspective view of the pit showing chambers of the pit.

As shown in FIG. 2, the sections 14 and 18 incorporate multiple chambers while the section 16 includes only a single chamber.

In this respect, the section 14 includes a heat chamber 22 which includes heat source means 24, such as coals 24 supported on a grate 26. Beneath the grate 26 there is provided an ash tray 28 into which ashes from the coals 24 fall. The tray 28 is slidably received within the section 14 for easy removal and emptying thereof as shown.

Above the heat chamber 22 is a cooking chamber 30 which is shown, for the sake of simplicity, as including one grating or grate 32 on which the meat 36 to be cooked is placed. It is to be understood that multiple grates 32 may be provided in this chamber 30.

The middle sauce applying section 16 comprises a single chamber 40 within which a dipping basket 42 containing cooked meat 36 is shown suspended above a pan 44 at the bottom of the chamber 40 within which a barbecue sauce 46 to be applied to the meat 36, which has been cooked in the cooking chamber 30, is received.

The third section 18 comprises two chambers, one being a sauce drying chamber 48 and the other being a prepared meat storing chamber 50.

It will be understood that the sections 14 and 16 are separated one from the other by a wall 51 and the sections 16 and 18 are separated by a wall 52, both of which extend upwardly from a bottom surface 54 of the shell 12 and terminate upon engagement with the exhaust hood structure 20.

Figure 3:
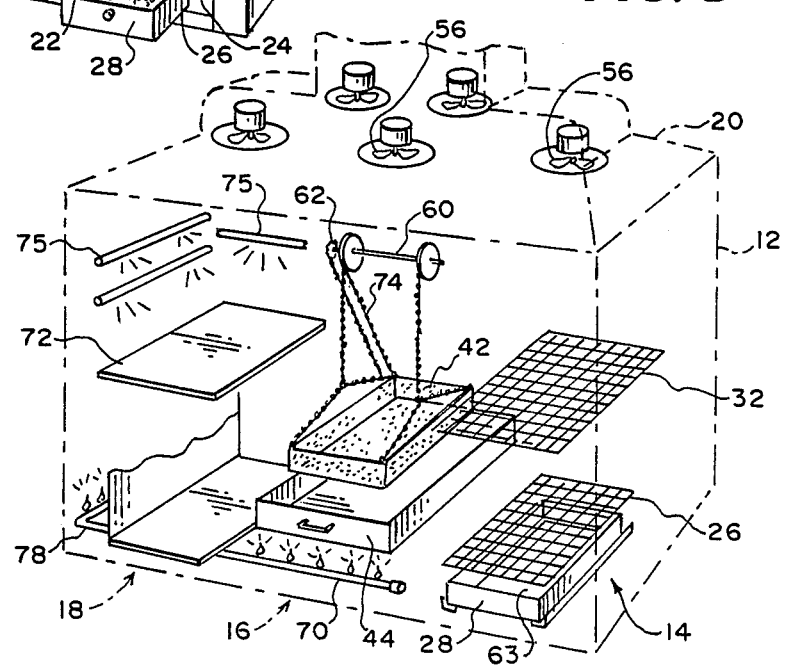
FIG. 3 is a perspective view, with the exterior wall of the pit shown in phantom, of the various chambers and structures thereof, relative one to the other.

Turning now to FIG. 3, the arrangement of the elements within the chambers of the pit 10 is clearly shown. The shell 12 of the pit 10 is shown in phantom, as is the exhaust hood structure 20, and the intervening walls 51 and 52 between the chambers have been deleted.

As shown, the hood structure 20 includes a plurality of fans 56 therein which are activated by known means upon the opening of doors of the various chambers of the pit 10.

For example, a pushbutton switch (not shown) which is functionally engaged to a power supply for the fans 56 may be provided between the doors and the walls supporting the doors such that, upon opening of the doors, the button of the switch is activated to complete a power circuit for the fans 56 and turns the fans 56 on upon actuation. Then, when the doors are closed, the switch is deactivated, and function of the fans 56 ceases.

The section 16 includes a single chamber 40 wherein meat 36 which has been cooked in the cooking chamber 30 is placed into the basket 42 which is suspended above the pan 44 at the bottom of the chamber 40 within which the barbecue sauce 46 is held. The basket 42 is perforated and is sized to be received within the pan 44 so that, when the basket 42 is lowered into the pan 44, the cooked meat 36 becomes coated with barbecue sauce 46. The lowering and raising of the basket 42 is accomplished by suspending the basket 42 from a bar 60 which is rotatable and which extends across the chamber 40 and has one end 62 thereof terminate within the third compartment 18 as will be described in greater detail in connection with the description of FIG. 4.

It will be seen that a heat source 70, here in the form of a gas burner 70, is provided beneath the sauce pan 44, to maintain the barbecue sauce 46 at a suitable temperature, such as at 350°. This temperature may be maintained by any known thermostatic control means.

Turning now to the third compartment 18, it will be noted that the sauce drying chamber 48, although shown as including only one grate or platform 72, is not to be limited to this simple embodiment. The sauce drying chamber 48 is provided along the sides and back thereof with ultraviolet lights 75 which are used to dry the barbecue sauce 46 coating the meat 36 onto the meat 36 without drying out the meat 36.

Once the sauce 46 has been dried onto the meat 36 to a point where it is "sticky" to the touch, the meat 36 is considered "prepared" and is ready to be stored in the prepared meat storage chamber 50. This chamber 50, in like manner to the sauce applying chamber 40, is provided with a gas burner 78 and maintained at a constant temperature, such as at 300°.

Figure 4:
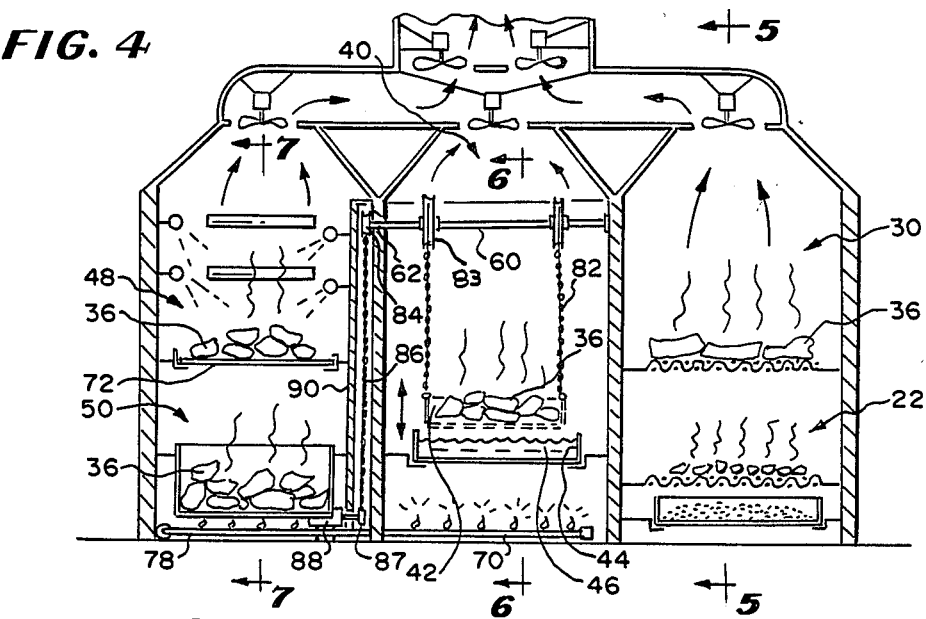
FIG. 4 is a cross sectional view through the pit and is taken along line 4—4 of FIG. 1.

With reference to FIG. 4 a user of the pit 10 first prepares a fire in the heat chamber 22 and turns on the gas burners 70 and 78 which keep the sauce applying chamber 40 and storage chamber 50 warm. When the temperature within the heat chamber 22, as well as the temperature within the cooking chamber 30 thereabove, reaches a preferred temperature, such as 400° F., for example, a layer of meat 36 to be barbecued is placed onto each grate 32 within the cooking chamber 30. When the meat 36 has been cooked sufficiently, the meat 36 is removed by the user from the cooking chamber 30 and placed within the basket 42 within the sauce applying chamber 40. The basket 42 is lowered into the pan 44 of barbecue sauce 46, where it remains for several minutes while the sauce 46 flows into the basket and coats the meat 36.

Once the meat 36 is coated with the sauce 46, the basket 42 is lifted out of the pan 44 of sauce 46. The user then removes the meat 36 from the basket 42 and places the meat 36 in single layers onto the grates 72 in the sauce drying chamber 48. Once the sauce 46 is sticky to the touch, the meat 36 is transferred to the prepared meat storage chamber 50.

In this Figure, the mechanical workings of the dipping basket 42 are best shown.

As illustrated, the basket 42 is suspended by cables 82 from the rod 60. Two disks 83 may be mounted on the rod 60 at the point of attachment of the cables 82 onto which the cables 82 may be wound to maintain the cables 82 straight during winding and unwinding of the cables 82.

One end 62 of the rod 60 extends through the wall 52 into the third compartment 18. The end 62 of the rod 60 is provided with a cogwheel type structure 84 the teeth of which are engaged by suitable means, such as a chain 86 which is also engaged over a drive gear 87 of a bidirectional motor 88 situated within the third compartment 18. The chain 86, cogwheel 84 and motor 88 are all enclosed within a housing or cover 90 which forms an inside side wall 90 for the compartment 18 to keep lubricant for the motor 88 and chain 86 from contacting the meat 36.

A small control panel 92 (FIG. 1) for controlling the winding and unwinding of the cables 82 may be provided on a front surface of the wall 52 and electrically engaged to the drive motor 88 for the rod 60. The control panel 92 may be of the two button type illustrated, having one button 94 energize the motor 88 in one direction to produce lowering of the basket 42, and the other button 96 energize the motor 88 in the other direction to produce raising of the basket 42.

Figure 5:
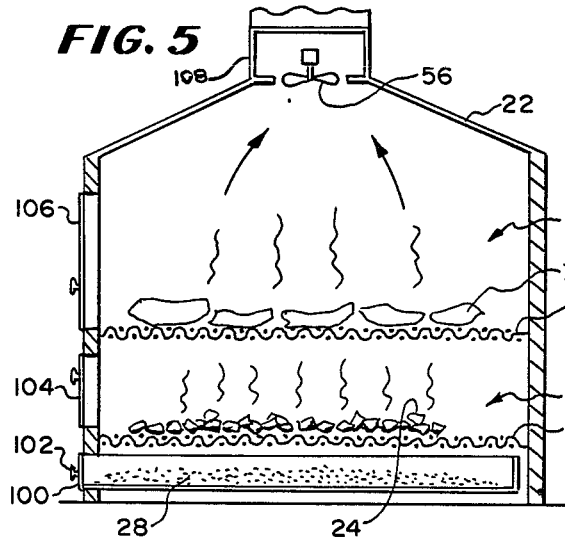
FIG. 5 is a cross sectional view through a cooking section of the pit and is taken along line 5—5 of FIG. 4.

FIG. 5 is a cross sectional view through the first compartment 14. Here again, although only one grating 32 is illustrated, several gratings 32 may be provided for receiving meat 36 to be cooked thereon. The heat chamber 22 includes the grating 26 onto which the coals 24 are placed and then ignited. Below the coal grating 26 is located the ash tray 28 which has a front door or wall 100, preferably made of an insulating material, mounting a handle 102 for the user to grasp and slide the tray 28 out of the compartment 14 for cleaning.

In order to allow access to the heat chamber 22, it is provided with double doors 104, also preferably made of an insulating material. The cooking chamber 22 also is provided with double doors, 106, but these are preferably made of glass to allow the user to view the meat 36 during cooking.

The hood structure 22 is provided with at least one fan 56 at a position above the cooking chamber 30 and when the doors 106 are opened, they trigger a switch (not shown) which actuates the fan 56 to draw smoke and gases upwardly into the hood structure 22 and then into a chimney 108 of the hood structure 22.

Figure 6:
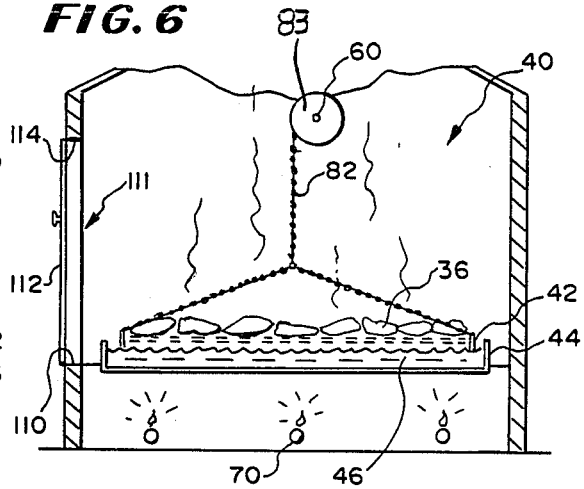
FIG. 6 is a cross sectional view through a sauce applying section of the pit and is taken along line 6—6 of FIG. 4.

In FIG. 6 the sauce applying chamber 40 is illustrated in cross section. Here it will be seen that the sauce pan 44 is supported above the burners 70 therebeneath at the level of the bottom 110 of an opening 111 in the chamber 40 which is covered by glass doors 112. The rod 60 is shown positioned within the chamber at a position slightly above a top edge 114 of the door opening 111. Alternatively, the rod 60 could be suspended across top surfaces of the walls 51 and 52.

In either case, the cables 82 are of sufficient length to allow the dipping basket 42 to be entirely submersed within the pan 44 so that the sauce 46 may flow through perforations in the basket 42 and coat the meat 36.

Figure 7:
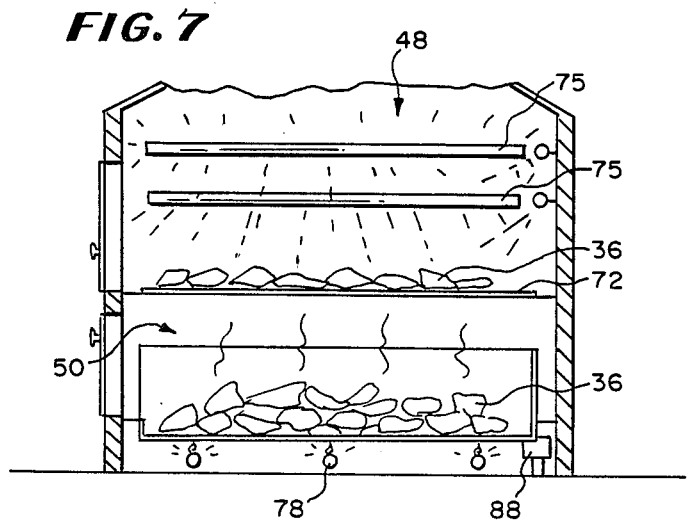
FIG. 7 is a cross sectional view through a sauce drying and storing section of the pit and is taken along line 7—7 of FIG. 4.

Then, as shown in FIG. 7, the meat 36 is placed in a single layer on one of several grates 72 within the sauce drying chamber 48 where the ultraviolet lights 75 act on the sauce 46 to dry same onto the meat 36 until such point that the sauce 46 is sticky. The meat 36 is then removed from the drying chamber 48 and layered in the prepared meat storage chamber 50 where it is maintained warm, until it is used.

From the foregoing it will be apparent that the barbecue pit 10 of the present ivnetion has a number of advantages, some of which have been described above and others of which are inherent in the invention. Also, various modifications can be made to the barbecue pit 10 without departing from the teachings of the present ivention. Accordingly the scope of the invention is only to be limited as necessitated by the accompanying claims.

I claim:

1. A barbecue pit comprising:
   a shell of masonry including a bottom wall, side walls, a back wall and a partial front wall, said shell further including two inner wall sections which divide the space within the shell into identical first, second and third compartments extending front to back within the shell;
   said first compartment including a cooking chamber having a plurality of horizontal grates removably supported therein and a topless heat chamber including heat source means beneath said cooking chamber for supplying heat and smoke to said cooking chamber;
   said second compartment including a sauce applying chamber having a container of sauce therein and means for applying said sauce to cooked meat placed within said chamber; and
   said third compartment including a sauce drying chamber including a plurality of horizontal grates removably supported therein and a plurality of ultraviolet light emitting means situated about said chamber for drying said sauce onto said meat to provide prepared meat, and a prepared meat storing chamber including heat source means for maintaining the prepared meat at a predetermined temperature; and
   an exhaust hood forming a top wall of the shell and mounting means therein for exhausting gas and smoke from within the compartments upwardly into a chimney of the hood.

2. The pit of claim 1 wherein said exhaust hood exhausting means comprise a plurality of fans mounted in said hood.

3. The pit of claim 2 wherein an entrance to each chamber is covered by doors.

4. The pit of claim 1 further including a removable ash tray positioned beneath said heat chamber.

5. The pit of claim 1 wherein said heat source means for said heat chamber comprises coals.

6. The pit of claim 1 wherein said heat source means for said second and third compartments comprise gas burners.

7. The pit of claim 1 wherein said sauce applying means comprise a basket which is movable to be immersed into a pan of sauce located thereunder.

8. The pit of claim 2 wherein said fans are engaged to switch means which are operated by the chamber doors upon opening thereof to actuate said fans.

9. The pit of claim 7 wherein said basket is manually movable.

10. The pit of claim 7 wherein said basket is suspended from a support rod located above the basket.

11. The pit of claim 10 wherein said basket is suspended from said support rod by cables.

12. The pit of claim 11 wherein said support rod is rotatable and wherein said cables are wound onto and off of said rod.

13. The pit of claim 12 wherein said support rod includes a cogwheel at one end thereof which is engaged to a cogwheel of a motor by a chain.

14. The pit of claim 13 wherein said motor is a bidirectional motor.

15. The pit of claim 13 wherein said motor is engaged to control means for controlling the direction of operation of said motor.

* * * * *